United States Patent [19]

Bookbinder

[11] Patent Number: 4,479,108

[45] Date of Patent: Oct. 23, 1984

[54] SYNCHRONIZATION INDICATOR FOR AT LEAST TWO CARBURETORS

[76] Inventor: David Bookbinder, 448 E. Annette, Phoenix, Ariz. 85022

[21] Appl. No.: 372,736

[22] Filed: Apr. 28, 1982

[51] Int. Cl.[3] ........................ G01M 15/00; B60Q 9/00

[52] U.S. Cl. .................................. 340/52 R; 180/219

[58] Field of Search ............ 340/52 R; 180/219, 223, 180/224, 230; 200/61.89, 61.9, 153 T; 123/438, 579, 583, 339; 73/118

[56] References Cited

U.S. PATENT DOCUMENTS 4,150,357 4/1979 Purney, Sr. et al. ............ 340/52 R 4,411,154 10/1983 Kitamura et al. ............... 123/339 X

*Primary Examiner*—John W. Caldwell, Sr.

*Assistant Examiner*—Ellwood G. Harding

*Attorney, Agent, or Firm*—Don J. Flickinger

[57] ABSTRACT

In a multi-carburetor engine system, a microswitch is provided for detecting when each of the carburetors begins the transition from the idle mode to the high speed mode in response to actuation of the vehicle's acceleration. The transition is marked by the microswitch closing which in turn causes a lamp to be lit. If each lamp associated with each carburetor does not light at substantially the same time, the carburetors are not synchronized and adjustments are required. A lockout circuit is provided for setting the period of time in which all lamps must light arbitrarily low.

9 Claims, 6 Drawing Figures

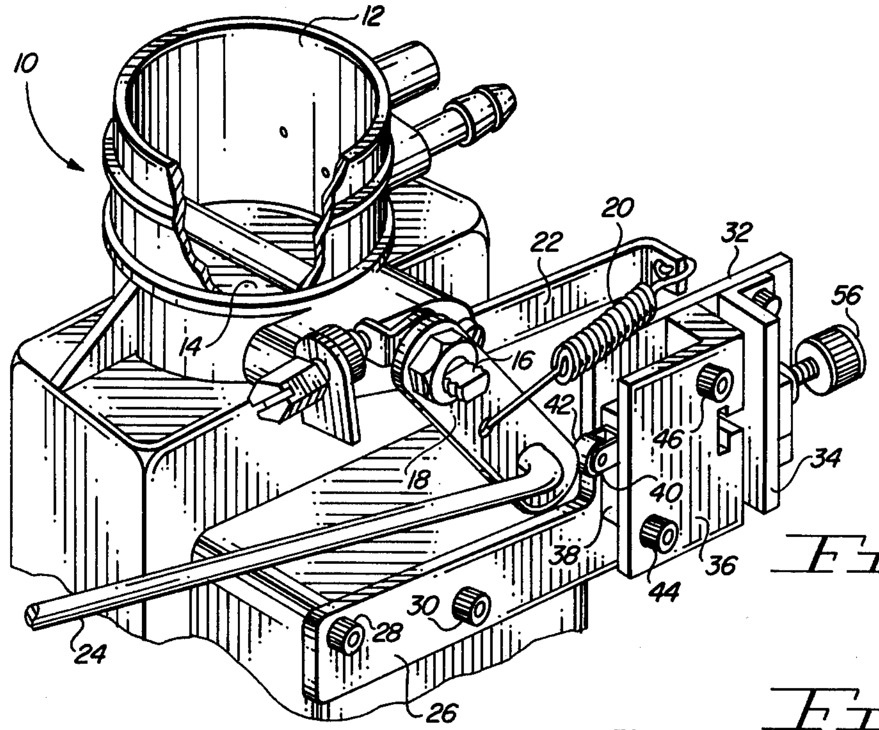
FIG. 1
FIG. 2
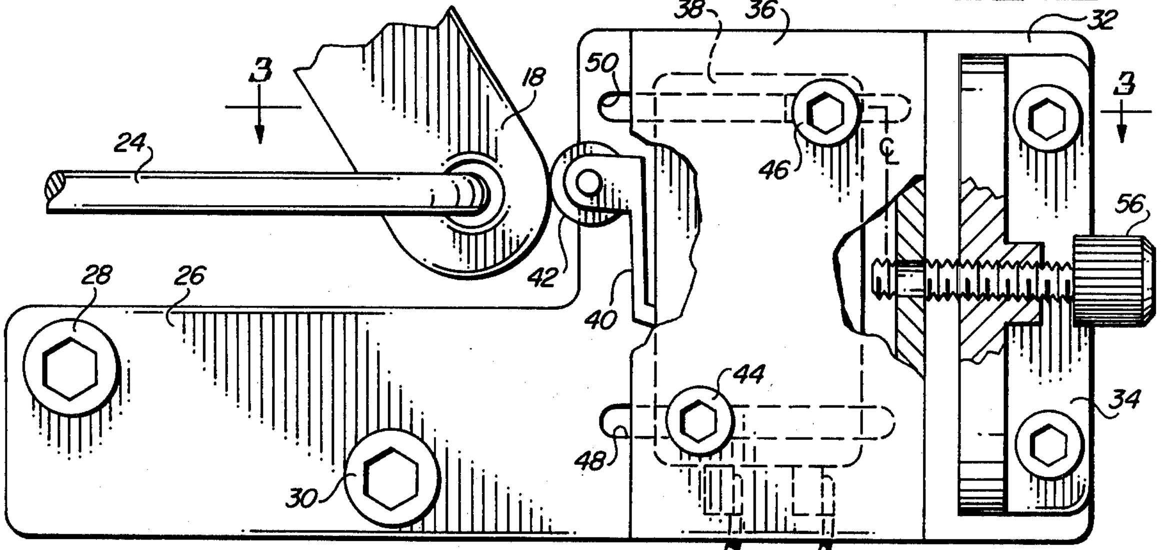
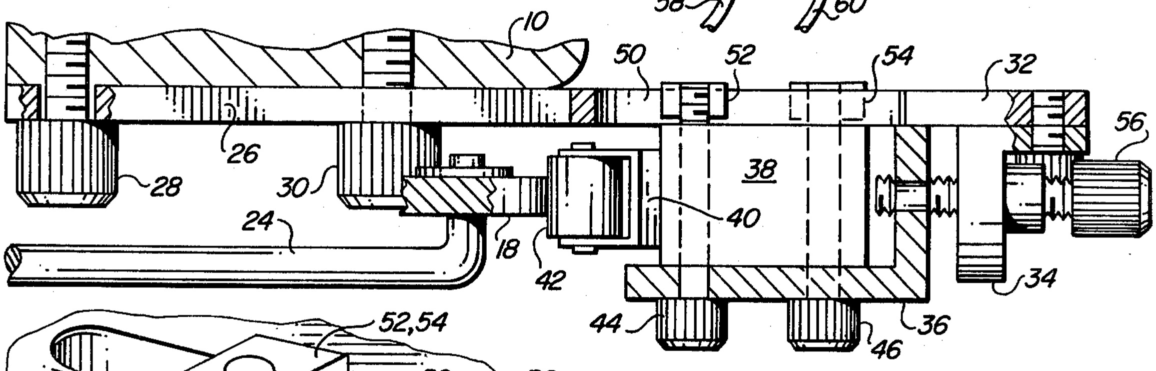
FIG. 3
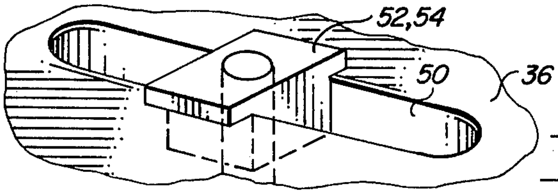
FIG. 4

SYNCHRONIZATION INDICATOR FOR AT LEAST TWO CARBURETORS

FIELD OF THE INVENTION

This invention relates generally to carburetion and, more particularly, to a method and apparatus for determining when a plurality of carburetors are performing in a synchronized manner.

PRIOR ART

Mixing gasoline and air in a carburetor to form a combustible mixture is a well known and simple process. However, carburetors for modern automobiles or motorcycles are considerably more complicated due to the wide variety of crankshaft speed and load conditions under which a modern engine must operate.

Most carburetors include a float system, a cruising or high speed system, an idle or low speed system, a power system, and a choke system. Not only must each system function correctly if the engine served by the carburetor is to deliver proper performance, but if more than one carburetor serves the engine (as is often the case with motorcycles), it is necessary that the carburetors be synchronized with each other for reasons which will become apparent.

The float system serves as a temporary reservoir for fuel flowing from the fuel pump. A float and valve assembly ensure that an adequate supply of fuel is maintained within a float bowl.

When the driver of an automobile or motorcycle activates the accelerator mechanism, a throttle valve in the carburetor opens. The intake stroke of the pistons creates a suction which causes air to be drawn into the carburetor where it picks up fuel. The air/fuel mixture is then drawn into the engine cylinders. As the air passes through the entrance to the carburetor, it reaches a section which is slightly narrower than the rest of the carburetor bore. This narrower section causes a partial vacuum to be created which increases as the speed of the flowing air increases. The partial vacuum draws fuel from the float bowl through a hollow tube having one end in the float bowl and another end positioned within the region of narrower bore (the venturi). This hollow tube may be referred to as the main nozzle. After the fuel is drawn from the float bowl into the venturi, it is carried by the airstream into the engine.

The above description of how an air/fuel mixture reaches the engine pertains to the cruising or high speed system. The idle or low speed system may be described as follows. When the throttle is open just enough to allow the engine to idle (i.e., the throttle valve is substantially closed), a vacuum will be produced on the engine side of the throttle valve which is used to draw the fuel for idling from the float bowl and into the engine through various passageways with drilled holes or air-bleeds which vaporize the fuel before it leaves the carburetor. This approach is not employed during cruising or high speed because as the throttle is opened, the vacuum decreases. At a wide open throttle, for example, the vacuum will fall to nearly zero; however, since the air is quickly flowing through the carburetor bore, the venturi principle works fine.

An accelerating pump system is required since when the throttle is opened, either from idle or from a constant speed to a higher speed, there is an immediate rush of additional air through the carburetor. Unfortunately, it takes a fraction of a second to get the fuel moving through the main nozzle. During this time, the engine is receiving an extremely lean air/fuel mixture causing a stumble or flat spot. This problem is avoided by an accelerating pump system which may comprise a cylinder located proximate the float bowl and containing a piston. If the throttle is suddenly opened, the piston is forced through the cylinder by the throttle linkage causing a stream of fuel to shoot out of the cylinder and into the carburetor bore.

It should be clear that to have an effective and high performance transition from the idle or low speed mode to the cruising or high speed mode when the throttle is suddenly opened, the carburetors in a multi-carburetor system, must be synchronized. That is, the throttle linkage assembly must be adjusted so that the throttle valve and acceleration pump in each carburetor are acted upon simultaneously. Once so adjusted, a need exists to enable the operator to easily determine if the carburetors are still synchronized or if corrective steps should be taken.

For the foregoing and other reasons, it would be highly advantageous, therefore, to remedy the deficiencies inherent in the prior art.

Accordingly, it is an object of the present invention to provide a method and apparatus for easily determining if the carburetors in a multi-carburetor engine system are synchronized.

Another object of the invention is the provision of an apparatus which is readily usable in connection with pre-existing prior art carburetors.

And another object of this invention is to provide a method for displaying a visual signal in response to loss of synchronization.

Still another object of the instant invention is the provision of apparatus which can be installed with conventional tools and ordinary skill.

And still another object of the invention is to provide apparatus, according to the above, which is relatively inexpensive to produce and maintain.

SUMMARY OF THE INVENTION

Briefly, to achieve the desired objects of the instant invention in accordance with a preferred embodiment thereof, there is provided an apparatus for indicating when the throttle valve of a carburetor is opened so as to terminate the carburetor's idle mode of operation and initiate the carburetor's high speed mode of operation, said carburetor being equipped with a throttle valve control mechanism which is responsive to an accelerator control for opening and closing said throttle valve, said apparatus comprising: switch means mounted proximate said carburetor and responsive to movement of said throttle valve control mechanism, said switch means assuming a first condition when said control mechanism is in a first position and said switch means assuming a second condition when said control mechanism moves away from said first position; and circuit means coupled to said switch means for giving a visual indication when said switch means assumes said second condition.

According to a further aspect of the invention, there is provided an apparatus for indicating when each of a plurality of carburetors are synchronized with each other, each of said carburetors being equipped with a throttle valve which is opened to terminate its associated carburetor's idle mode of operation and initiate its high speed mode of operation, each of said throttle valves being coupled to a throttle valve control mechanism which is responsive to an accelerator control for opening and closing each of said throttle valves, said apparatus comprising: a plurality of switch means each one mounted proximate one of said plurality of carburetors and responsive to movement of said control mechanism, each of said switch means assuming a first condition when said throttle valve is in its idle position and assuming a second condition when said throttle valve opens beyond its idle position; and circuit means coupled to each of said switch means for giving a visual indication when each of said switch means assumes said second condition.

BRIEF DESCRIPTION OF THE DRAWINGS

The above and other objects, features and advantages of the present invention will be better understood from the following detailed description taken in conjunction with the accompanying drawings, in which:

FIG. 1 is an isometric view of a portion of one carburetor of a multi-carburetor system, the one carburetor including inventive monitoring apparatus for determining when the throttle linkage assembly has moved sufficiently to terminate the idle or low speed mode of operation and to initiate the cruising or high speed mode of operation;

FIG. 2 is a side view of a portion of the carburetor shown in FIG. 1 including the inventive monitoring apparatus;

FIG. 3 is a top cross-sectional view of the apparatus shown in FIG. 2 taken along the line 3—3;

FIG. 4 is an isometric view of a T-nut of the type used to couple the inventive monitoring apparatus to each carburetor;

DESCRIPTION OF THE PREFERRED EMBODIMENTS

Figure 5:
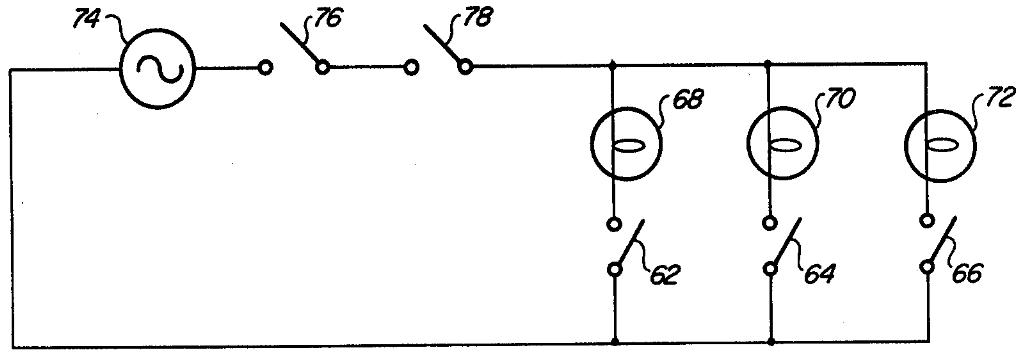
FIG. 5 illustrates, in schematic form, a first embodiment of the inventive synchronization indicator.

Referring to FIG. 1, there is shown one carburetor 10 of a multi-carburetor engine system. As can be seen, the carburetor 10 includes a bore 12 in which a throttle valve 14 is positioned. Throttle valve 14 is fixedly coupled to an extension 16 which is in turn coupled to a throttle control lever 18 such that clockwise movement of lever 18 will cause valve 14 to open. Valve 14 is biased closed by means of a spring 20 coupled between one end of member 22 and lever 18.

The counter-clockwise force exerted on lever 18 by spring 20 may be overcome by throttle control rod 24 which moves to the left when the accelerator pedal or control is activated. Obviously, in a multi-carburetor system, rod 24 or additional linkage cooperating therewith, would be coupled to the throttle control lever of the additional carburetor or carburetors such that all the throttle control valves would be opened upon actuation of the accelerator.

A mounting plate has a first section 26 configured to be coupled to the carburetor body (such as is shown at 28 and 30) and a second section 32 to which first and second brackets 34 and 36, respectively, having L-shaped cross-sections are coupled. A microswitch 38, equipped with a contact arm 40, roller 42, and terminals 58 and 60 is securely fastened behind bracket 36 by screws 44 and 46 which extend through microswitch 38 and slots 48 and 50, respectively, in mounting section 32 (as is shown in FIG. 2). Screws 44 and 46 threadedly engage T-nuts 52 and 54, respectively, (of the type shown in FIG. 4) which slide in slots 48 and 50, respectively, as shown in FIG. 3.

A control screw 56 is threadedly housed in bracket 34, as, for example, by an interference fit thread, and extends through bracket 36 in a push-pull relationship therewith as shown in FIGS. 2 and 3. Thus, if screws 44 and 46 loosely engage T-nuts 52 and 54, respectively, then bracket 36, and therefore microswitch 38, can be moved to the left or right by merely turning screw 56 in the clockwise or counter-clockwise direction, respectively. In practice, the position of the microswitch associated with each of the carburetors is adjusted such that when the carburetor is in the idle mode, the microswitch is open, and as soon as the accelerator is activated to initiate the high speed mode causing the throttle control lever to move to the left, the switch is closed. It should be clear that if the carburetors in a multi-carburetor system are properly synchronized, the microswitches will close at substantially the same time.

FIG. 5 is a schematic diagram of a circuit which gives an indication of the degree of synchronization between three carburetors, each of which is equipped with a microswitch as described previously. Each of the three microswitches 62, 64 and 66 are coupled in series with a lamp 68, 70 and 72, respectively. Each of the series combinations of a single microswitch and a single lamp is coupled across the terminals of a source of supply voltage 74 which may be derived from a vehicle's battery. The vehicle's ignition switch 76 and an indicator on/off switch 78 are coupled in series with the source of supply voltage 74. When it is desired to monitor the degree of synchronization between the carburetors, both ignition switch 76 and on/off switch 78 are closed. Thereafter, each of the microswitches 62, 64 and 66 will close in response to actuation of the accelerator as described previously. The closing of each microswitch will cause current to flow through its associated lamp causing it to turn on. If each of the lamps turn on at substantially the same time, the carburetors are synchronized. If, however, the lamps do not turn on at substantially the same time, the carburetors are not synchronized and adjustments are required.

Since the circuit shown in FIG. 5 requires a visual assessment of the degree to which lamps 68, 70 and 72 are turning on at the same time, it may be difficult to visually detect very slight differences (e.g., in the order of milliseconds). This problem is solved by the circuit shown in FIG. 6 wherein like elements are denoted by like reference numerals. In this circuit, switch 62 is coupled between source 74 and a first input of AND gate 80, a first input of OR gate 92 and a first input of NOR gate 94. Switch 64 is coupled between source 74 and a first input of AND gate 82, a second input of OR gate 92 and a second input of NOR gate 94. Switch 66 is coupled between source 74 and a first input of AND gate 84, a third input of OR gate 92 and a third input of NOR gate 94. The output of OR gate 92 is coupled to the count enable input (En) of a digital binary counter 96, and the output of NOR gate 94 is coupled to the reset (R) input of counter 96. A clock generator 98 supplies a stream of clock pulses at a desired frequency to the clock input (CL) of counter 96 via AND gate 104. A coincidence detecting AND gate 100 has inputs coupled to selected bits within counter 96 such that the output of AND gate 100 will go high when the counter has reached a predetermined state (e.g. one which corresponds to ten miliseconds). The output of AND gate 100 is coupled to the input of inverter 102 which in turn has an output coupled to the second inputs of AND gates 80, 82 and 84. Coupled between the outputs of AND gates 80, 82 and 84 and its associated lamps 68, 70 and 72, respectively, is a latch 86, 88 and 90, respectively. The output of NOR gate 94 is coupled to the reset (R) inputs of latches 86, 88, and 90.

Figure 6:
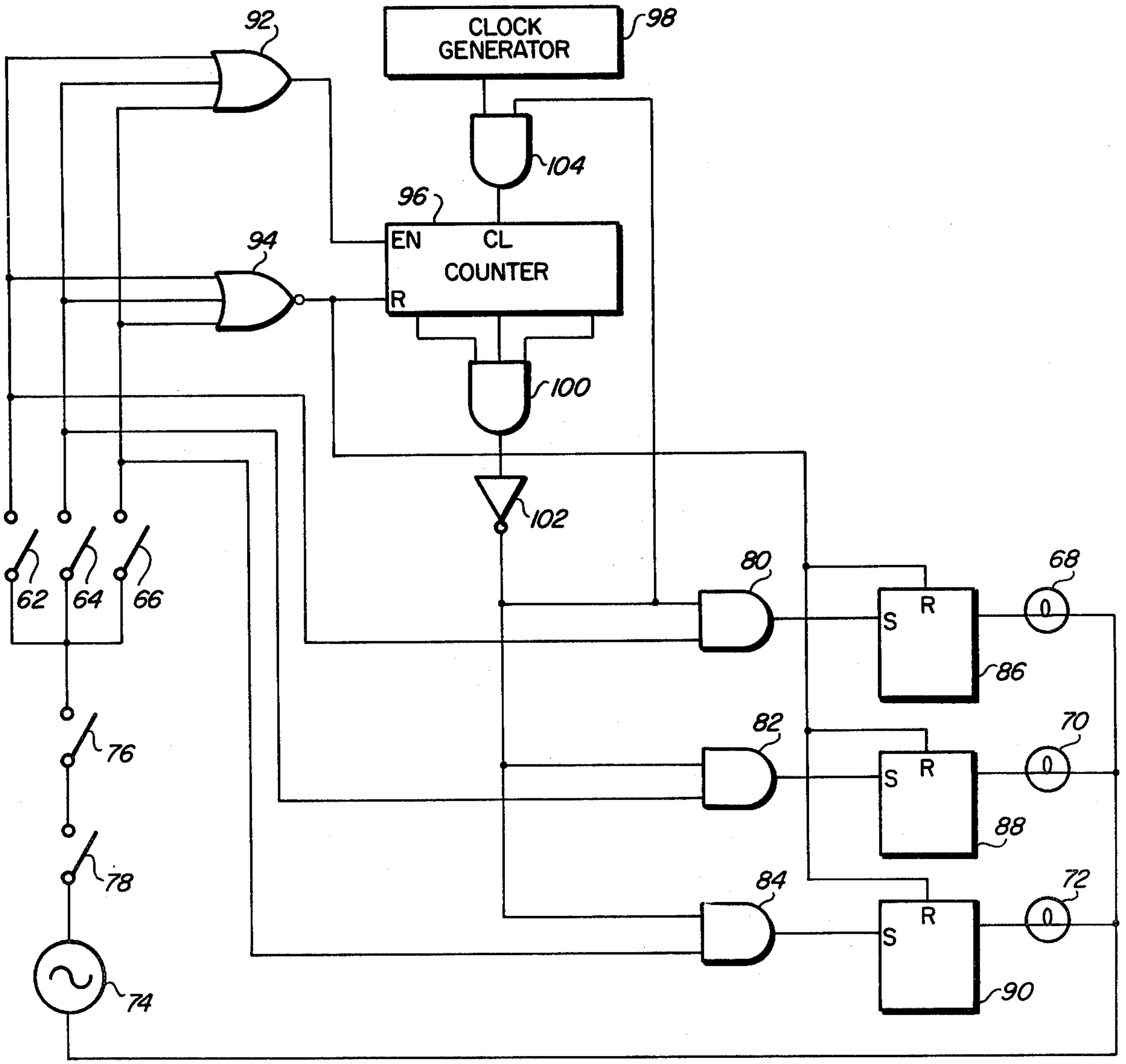
FIG. 6 is a schematic diagram of a second embodiment of the inventive synchronization indicator employing a timed lockout mechanism.

The lockout circuit shown in FIG. 6 operates as follows. Assuming both ignition switch 76 and on/off switch 78 are both closed, and microswitches 62, 64 and 66 are open (each of the carburetors are in the idle mode), a low voltage is applied to each of the inputs of NOR gate 94 causing its output to go high. This will cause counter 96 and latches 86, 88 and 90 to be reset. Thus, the output of AND gate 100 will be low and the output of inverter 102 will be high.

As soon as one of the microswitches close, a low voltage will appear at the output of NOR gate 94 removing the reset signal from counter 96 and latches 86, 88 and 90. Furthermore, the output of OR gate 92 will go high which enables counter 96 to count clock pulses which are supplied by clock generator 98.

If, for example, microswitch 62 were to close as a result of its associated carburetor moving from the idle mode to the high speed mode, counter 96 would begin counting. Also, since both inputs to AND gate 80 are high, latch 86 would set causing lamp 68 to turn on. Prior to counter 96 reaching the above referred to predetermined state, the output of inverter 102 will remain high. Therefore, if either microswitch 64 and/or 66 should close prior to counter reaching the predetermined state, latches 88 and/or 90, respectively, will be set causing lamps 70 and/or 72, respectively, to light.

When counter 96 reaches the predetermined state, the output of AND gate 100 will go high causing the output of inverter 102 to go low. This terminates the supply of clock pulses to counter 96 and thus prevents it from incrementing any further. Furthermore, a low at the output of inverter 102 disables AND gates 80, 82 and 84. Therefore, if any of latches 86, 88 and 90 are not set prior to counter 96 reaching its predetermined state, they are precluded from being set thereafter and their associated lamps will remain off. Clearly then, unless all lamps light within the period of time it takes counter 96 to count to the predetermined state, the carburetors are not synchronized and adjustments are required. The predetermined period of time may be chosen arbitrarily low (e.g. 10 ms).

The above description is given by way of example only. Changes in form and details may be made by one skilled in the art without departing from the scope of the invention as defined by the appended claims.

Having fully described and disclosed the present invention in such clear and concise terms as to enable those skilled in the art to understand and practice the same, the invention claimed is:

1. An apparatus for indicating when each of a plurality of carburetors are synchronized with each other, each of said carburetors being equipped with a throttle valve which is opened to terminate its associated carburetor's idle mode of operation and initiate its high speed mode of operation, each of said throttle valves being coupled to a throttle valve control mechanism which is responsive to an accelerator control for opening and closing each of said throttle valves, said apparatus comprising:

a plurality of switch means each one mounted proximate one of said plurality of carburetors and responsive to movement of said control mechanism, each of said switch means assuming a first condition when said throttle valve is in its idle position and assuming a second condition when said throttle valve opens beyond its idle position; and circuit means coupled to each of said switch means for giving a visual indication when each of said switch means assumes said second condition.

2. An apparatus according to claim 1 wherein said circuit means comprises:

a source of supply voltage; and a plurality of lamps, each one coupled in series with one of said plurality of switch means and said source of supply voltage.

3. An apparatus according to claim 1 wherein each of said plurality of switch means comprises a microswitch having a contact arm which contacts said mechanism.

4. An apparatus according to claim 3 wherein each of said plurality of switch means further comprises:

a mounting plate fixedly coupled to said carburetor;

a first bracket slidably coupled on said mounting plate, said microswitch being fixedly coupled to said first bracket; and first control means fixedly coupled on said mounting plate and in engagement with said first bracket for adjusting the position of said first bracket and therefore said microswitch.

5. An apparatus according to claim 4 wherein each of said mounting plates is equipped with first and second slots and wherein each of said microswitch is secured to its associated first bracket by screw and nut assemblies which pass through said first and second slots so as to permit the first bracket to slide on its associated mounting plate.

6. An apparatus according to claim 5 wherein each of said first control means comprises screw means threadedly adjustable on its associated mounting plate and coupled to its associated first bracket so as to move its associated first bracket along its mounting plate when the screw means is rotated.

7. An apparatus according to claim 6 wherein each of said first brackets is positioned on its respective mounting plate such that the contact arm of the microswitch coupled to the first bracket engages the control mechanism to open the microswitch when its respective carburetor is in said idle mode and to close the microswitch when its respective carburetor enters its high speed mode of operation.

8. An apparatus according to claim 7 wherein said circuit means comprises:

a source of supply voltage; and a plurality of lamps, each one coupled in series with one of said microswitches and said source of supply voltage, said carburetor being synchronized if each of said lamps is energized within a predetermined period of time.

9. An apparatus according to claim 8 further comprising means for detecting if each of said lamps is energized within said predetermined period of time.

* * * * *